March 23, 1926.
F. G. HIBBARD
ROOF FRAMING SCALE
Filed Oct. 29, 1923
1,577,717
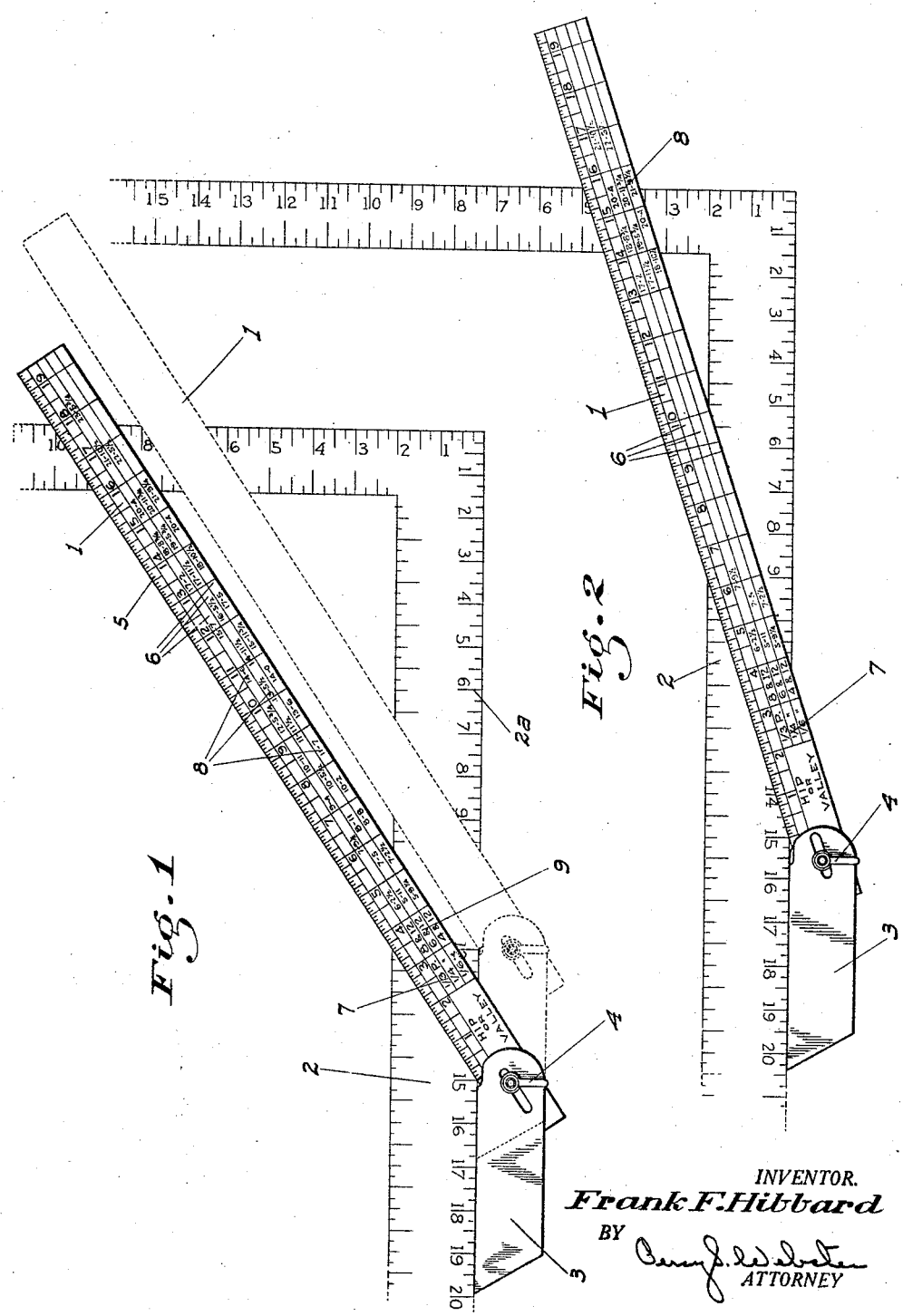
INVENTOR.
Frank F. Hibbard
BY
ATTORNEY Patented Mar. 23, 1926.

1,577,717

UNITED STATES PATENT OFFICE.

FRANK F. HIBBARD, OF LODI, CALIFORNIA.

ROOF-FRAMING SCALE.

Application filed October 29, 1923. Serial No. 671,311.

*To all whom it may concern:*

Be it known that I, FRANK F. HIBBARD, a citizen of the United States, residing at Lodi, county of San Joaquin, State of California, have invented certain new and useful Improvements in Roof-Framing Scales; and I do declare the following to be a full, clear, and exact description of the same, reference being had to the accompanying drawings, and to the characters of reference marked thereon, which form a part of this application.

This invention relates to an implement to be used by carpenters, building contractors, estimators and the like in connection with the framing of wooden roofs; the principal object of my invention being to provide a scale, usable in conjunction with an ordinary carpenter's square, for enabling the length of the main rafters of the roof, and more especially the hip or valley rafters, being readily found for a roof of any normal pitch without the necessity of any figuring having to be done by the workman.

At present, the length of the hip or valley rafters is usually ascertained by a paper calculation on the job—a method very frequently resulting in mistakes owing to the calculator being distracted while at work, or possibly to a lack of proper mathematical knowledge.

Sometimes the length is ascertained by the crude method of raising a piece of wood of a greater length than necessary into place, and then marking and cutting it to the right length.

Either method is obviously unsatisfactory and consumes valuable time which is saved by the use of my scale, which has rafter-lengths for different building widths and roof pitches stamped thereon in such a manner that no mistakes can be made in getting the desired figure; the necessary calculations having all been previously done.

I therefore feel that this scale should prove a boom to the building trades, being a valuable help not only to those actually setting up a building, but to those who wish or whose duty it is to figure up the amount of lumber required for the building.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views:

Fig. 1 is a plan view of my scale, showing the same as used in connection with an ordinary carpenter's scale.

Fig. 2 is a similar view, showing the scale set for a roof of different pitch.

Referring now more particularly to the characters of reference on the drawings, the numeral 1 denotes a straight and rigid scale member of suitable dimensions adapted to rest on and slide over the flat faces of an ordinary carpenter's square 2.

At the initial or zero end of the scale is pivotally mounted a handle 3, adapted to be engaged with the outer edge of the scale 2, a clamp member 4 being mounted with the scale handle to lock or clamp the two together at any desired angle.

That edge of the scale 1, which is adjacent the square engaging edge of the handle is divided throughout into subdivisions or units of the same length and corresponding to the scaling $2^a$ on the square 2, which is commonly divided into inches, each of which is in turn divided into twelfths, so that the square may be used, as it commonly is, to make layouts on a scale of one inch to the foot.

On the scale, below the edge subdivisions, is a number of separated longitudinal spaces 6, each having a certain pitch-symbol as at 7 at one end.

In each space is placed, in longitudinally spaced relation, a row of figures 8, each one of which represents the calculated length of a hip or valley rafter for a certain length of main rafter and for a roof of the pitch denoted by the symbol or index 7 at the end of the space.

The edge subdivisions on the scale denote the main rafter lengths, as will be hereinafter seen, and the corresponding hip or valley rafter figures for any length of main rafter, and for the different pitches of roof, are located in the spaces 6 directly under said main rafter lengths, so that there is no danger of the user, having found a certain main rafter length, making a mistake in getting the corresponding hip-rafter length.

The figures representing said hip or valley rafter lengths are of course, as stated in the preamble, all figured out accurately before being placed on the scale, since the worker is presumed to rely on these figures as being correct.

In the operation of the scale, the worker, knowing the pitch of the roof (usually ⅓, ¼, or ⅙) and the width of the building (which is or should be an even number of feet), proceeds as follows; assuming that the building is 30 feet wide and the roof is a ⅓ pitch.

A pitch of ⅓ means a rise of 8 to a length of 12—a proportion of figures which, together with those corresponding to the other pitches, is stamped on the scale as at 9 in alinement with the pitch index, for the convenience of the user.

Assuming then that a ⅓ pitch is to be used, the operator sets the scale on the square so that the initial or zero mark at the edge of the scale adjacent the handle alines with the 12 inch mark at the outer edge of one of the legs of the square, and then shifts the outer portion of the scale till its subdivided edge alines with the outer edge of the outer 8 inch mark on the other leg of the square, as shown in the dotted position of the scale in Fig. 1.

The handle 3 is then swiveled to contact with the edge of the square, and the clamp 4 is tightened to maintain the handle and scale in fixed relation.

Assuming the full width of the building to be 30 feet, the ridge or peak of the roof will be in the vertical plane of half such width, or 15 feet.

The scale is then slid along the square until the zero mark on the scale coincides with the 15 inch mark at the outer edge of the square.

The point on the subdivisions on the edge of the scale where said edge crosses the outer edge of the other leg of the square will denote the exact length of a main rafter in feet and inches, in this case, 18 feet, 1 inch.

Under the above dimension, in the space corresponding to the pitch being used, will be one of the figures 8, or 23 feet, 5¾ inches, as shown in Fig. 1, which will be the exact length of a hip or valley rafter for the roof in question.

If a ⅙ pitch is used, as in Fig. 2, the scale is first set to this pitch in the same manner as above, using the corresponding figures 9 on the scale in connection with the square, and the scale is then slid along as before, until the zero mark on the scale coincides with that figure on the square which denotes half the building width. For a 30 foot building, as in the first instance, the main rafter length will be 15 feet, 10 inches, and that of the corresponding hip or valley rafter for that pitch will be 21 feet, 9¼ inches, using the figure 8 for the latter dimension in the lowest space 6, which is that occupied by the ⅙ pitch figures.

The hip or valley rafter dimensions shown on the scale will cover all ordinary widths of buildings. For greater widths, or intermediate odd widths if such were used, additional figures 8 would be computed and added to the scale at the necessary locations, which would be under the corresponding main rafter lengths as found by manipulation of the scale as hereinbefore described.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A roof-framing calculator for use in connection with an ordinary carpenter's square comprising a scale calibrated along one edge to correspond with the edge calibrations on the square, rows of figures under the edge calibrations precalculated to represent hip rafter lengths of different pitches corresponding to main rafter lengths as determined by the edge calibrations, and a pair of indicia numbers on the scale for each row of figures; said numbers being in proportion to lengths along the legs of the square so that when the scale is laid across the square and its edge intersects the edges of the square-legs at such lengths, the scale will be disposed on the square at an angle corresponding to a desired pitch of roof.

In testimony whereof I affix my signature.

FRANK F. HIBBARD.